(12) United States Patent
Largo

(10) Patent No.: US 8,226,341 B2
(45) Date of Patent: Jul. 24, 2012

(54) SHOCK ABSORBING FASTENER

(75) Inventor: Marc D. Largo, Gurnee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 274 days.

(21) Appl. No.: 12/369,392

(22) Filed: Feb. 11, 2009

(65) Prior Publication Data
US 2010/0202854 A1    Aug. 12, 2010

(51) Int. Cl.
*F16B 15/00*    (2006.01)
(52) U.S. Cl. ............ 411/439; 411/473; 411/923
(58) Field of Classification Search ........ 411/439–441, 411/473, 476, 501, 923, 372.5, 9; D8/391
See application file for complete search history.

(56) References Cited

U.S. PATENT DOCUMENTS

| | | | | |
|---|---|---|---|---|
| D27,639 S | * | 9/1897 | Bray | D8/386 |
| 1,944,150 A | * | 1/1934 | Brugge | 411/439 |
| 2,074,773 A | * | 3/1937 | Camp et al. | 411/377 |
| 2,237,338 A | * | 4/1941 | Dale | 411/501 |
| 2,864,276 A | | 12/1958 | Parker | |
| 3,696,701 A | | 10/1972 | Readyhough | |
| 4,002,098 A | | 1/1977 | Colechia | |
| 4,932,480 A | | 6/1990 | Golsch | |
| 5,025,971 A | | 6/1991 | Schafer et al. | |
| 5,443,345 A | | 8/1995 | Gupta | |
| 5,533,379 A | * | 7/1996 | Binder et al. | 72/316 |
| 5,680,690 A | * | 10/1997 | Briles et al. | 29/458 |
| 6,010,291 A | | 1/2000 | Schwingle | |
| 6,062,788 A | | 5/2000 | Ying-Feng | |
| 6,086,305 A | | 7/2000 | Lat et al. | |
| 6,352,398 B1 | | 3/2002 | Gonnet | |
| 6,779,698 B2 | | 8/2004 | Lin | |
| 6,964,362 B2 | | 11/2005 | Shknolnikov et al. | |
| 6,968,945 B2 | | 11/2005 | Bruins et al. | |
| 7,021,462 B2 | * | 4/2006 | Powers et al. | 206/338 |
| 7,131,563 B2 | | 11/2006 | Wen | |
| 7,207,095 B2 | | 4/2007 | Bruins et al. | |
| 2006/0006207 A1 | | 1/2006 | Akiba et al. | |
| 2007/0227477 A1 | | 10/2007 | Akiba et al. | |

\* cited by examiner

*Primary Examiner* — Gary Estremsky
(74) *Attorney, Agent, or Firm* — Levenfeld Pearlstein, LLC

(57) ABSTRACT

A fastener for driving into a substrate has a head having an upper surface and a lower surface, a penetrating tip and a shank extending from the lower surface of the head to the penetrating tip. At least one deformable feature is formed on the head. The deformable feature is configured to absorb energy and to deform. When a driving element is driven onto the head to drive the fastener into the substrate, the deformable feature absorbs energy and is deformed as the head contacts the substrate.

15 Claims, 3 Drawing Sheets

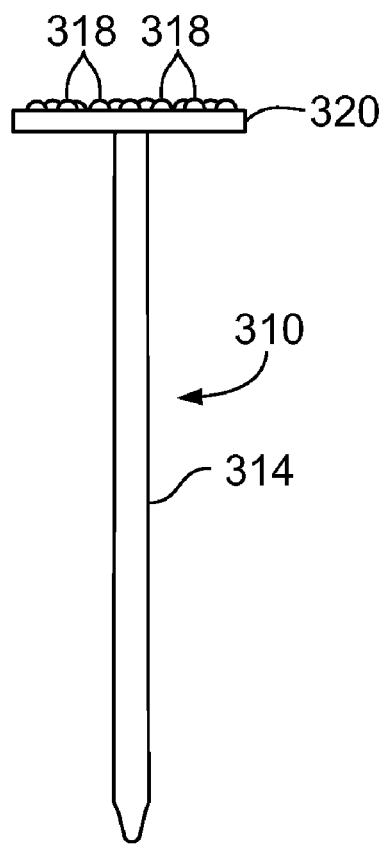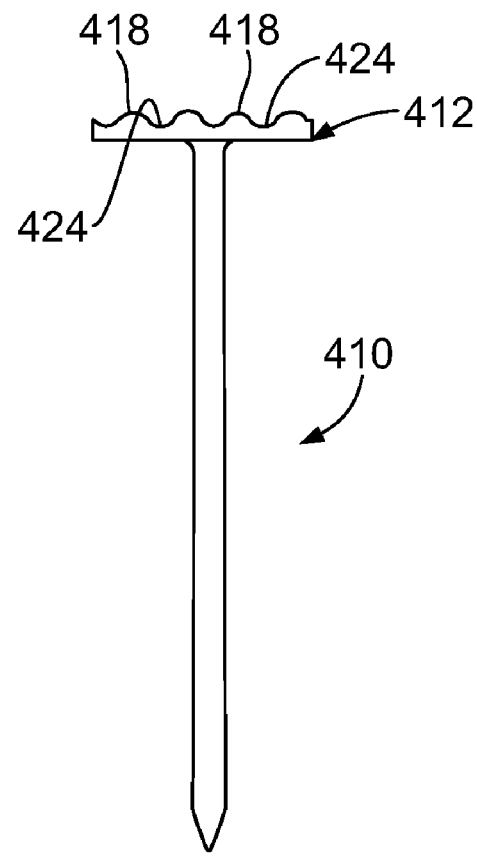
FIG. 4A
FIG. 5A
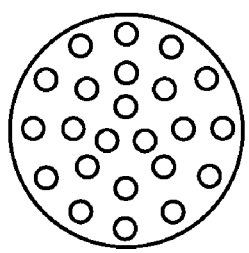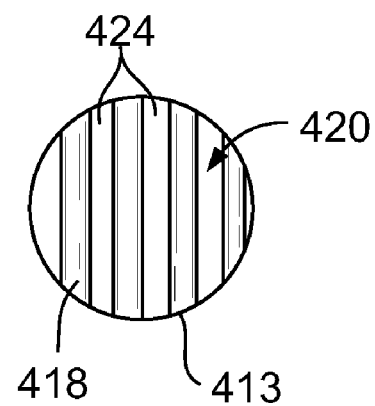
FIG. 4B
FIG. 5B

SHOCK ABSORBING FASTENER

BACKGROUND OF THE INVENTION

This invention pertains to fasteners. More particularly, the invention pertains to a fastener having a deformable portion for absorbing excess drive energy.

Fasteners, such as nails, have been produced for hundreds of years. Round nails are presently the most common type of nail and are the easiest type of nail to manufacture, because of their symmetrical shape. Moreover, round nails exhibit relatively predictable, uniform properties, when driven into a substrate, such as wood.

Many of today's fastening (nailing) applications, in particular in the construction industry, use powered or fastener driving tools, also referred to as nailers or nail guns. These tools can be pneumatic driven, combustion driven, electric or the like. In a typical tool, a reciprocating drive blade is brought into contact with the fastener head, separates the fastener from a fastener strip, and drives the fastener out of the tool and into the substrate.

In use, fasteners are driven into different types and thicknesses of material (substrates). A typical application is the nailing of two pieces of wood (lumber) to one another. The lumber can be relatively soft (such as spruce, pine or fir), or relatively hard, such as oak, ash or the like. Moreover, some applications require the use of a joining member, such as a metal joist hanger or plate, through which the fastener must also be driven.

When using a joining member, there is little margin for over driving (over travel) of the nail. Accordingly, the depth of drive must be precisely adjusted to prevent the tool and specifically the drive blade from experiencing an excessive shock when the fastener head abruptly stops on a hard, non-compliant metal surface. Moreover, this precise adjustment is even more impractical in that different, and even similar woods have varying hardnesses and densities, contain imperfections, natural inconsistencies (such as knots), dimples, dents and the like.

Accordingly, there is a need for a fastener that absorbs excess drive energy. Desirably, such a fastener can be used in a conventional fastener drive tool. More desirably, such a fastener absorbs a wide range of excess energy without structural damage to the fastener, the tool or the substrate.

BRIEF SUMMARY OF THE INVENTION

A nail for driving into a substrate has a head having an upper surface and a lower surface, a penetrating tip and a shank extending from the lower surface of the head to the penetrating tip. At least one deformable feature is formed on the head and is configured to absorb energy and to deform when a driving element is driven onto the head to drive the fastener into the substrate and the head contacts the substrate. The fastener can be used in a conventional fastener drive tool and absorbs a wide range of excess energy without structural damage to the fastener, the tool or the substrate, except for the deformation of the deformable feature.

In a present fastener, the deformable feature is formed softer than the nail shank. In one embodiment, the shank is heat treated (for hardening) and the head, including the deformable feature, is not heat treated.

The deformable feature can be formed on the upper surface of the nail head, in which case the deformable feature projects upwardly from the upper surface. Alternatively, the deformable feature can be formed on the lower surface, in which case the deformable feature projects downwardly from the lower surface. The deformable feature can be formed as an upwardly or downwardly projecting winding projection.

Alternatively, the deformable feature can be is formed as a series of features. The series of features can have differing heights or a uniform height as measured from the surface from which the features extend.

The series of features can be a series of rings formed extending from one or both of the upper and lower surfaces of the head, a series of pimples, or other shaped features.

Recesses can be formed in head adjacent to the deformable features to accommodate material as the features are deformed.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying illustrations and drawings, wherein:

FIG. 4A is a front plant view of yet another embodiment of a shock absorbing fastener;

FIG. 4B is a top view of the fastener of FIG. 4A;

FIG. 5A is a front plan view of still another embodiment of a shock absorbing fastener; and FIG. 5B is a top view of the fastener of FIG. 5A FIGS. 6A-6C illustrate still another embodiment of the shock absorbing fastener.

DETAILED DESCRIPTION OF THE INVENTION

Figures 1A, 1B, 2A, 2B, 3A, 3B:
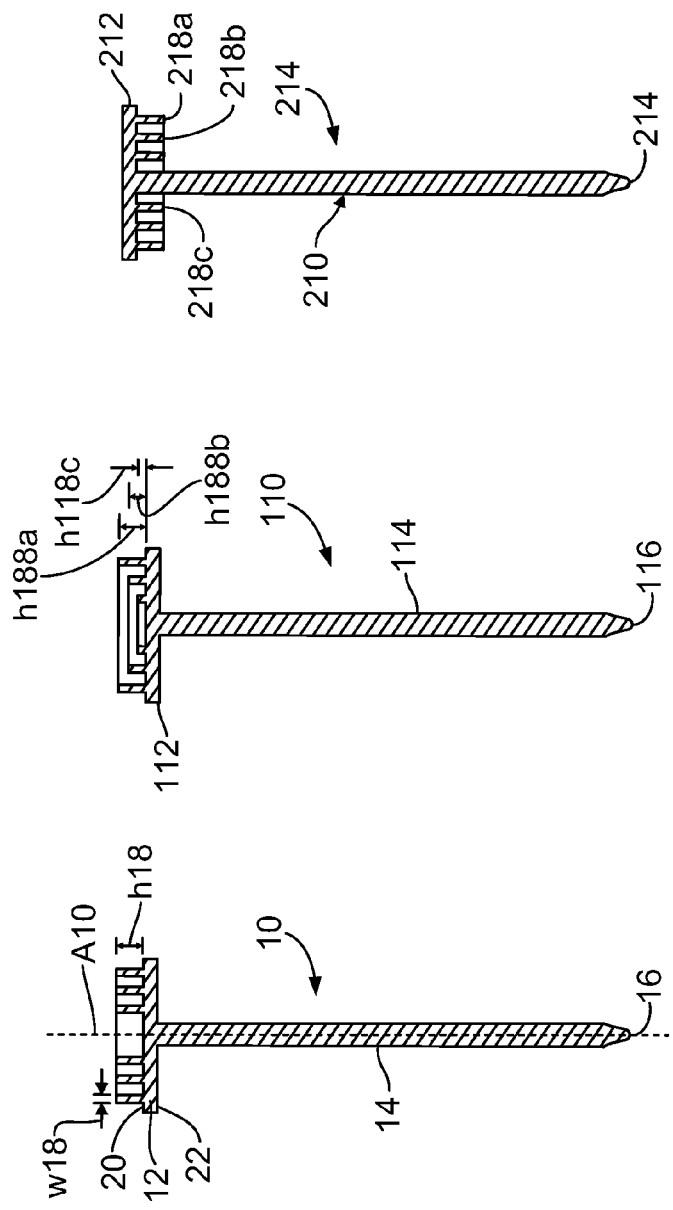
FIG. 1A is a front cross-sectional view of an embodiment of a shock absorbing fastener embodying the principles of the present invention, the view being taken along line 1A-1A of FIG. 1B.
FIG. 1B is a top view of the fastener of FIG. 1A.
FIG. 2A is a front cross-sectional view of an alternate embodiment of a shock absorbing fastener.
FIG. 2B is a top view of the fastener of FIG. 2A.
FIG. 3A is a front cross-sectional view of still another embodiment of a shock absorbing fastener.
FIG. 3B is a bottom view of the fastener of FIG. 3A.

While the present invention is susceptible of embodiment in various forms, there is shown in the drawings and will hereinafter be described several preferred embodiments with the understanding that the present disclosure is to be considered an exemplification of the invention and is not intended to limit the invention to the specific embodiments illustrated.

It should be further understood that the title of this section of the specification, namely, "Detailed Description of the Invention," relates to a requirement of the United States Patent Office, and does not imply, nor should be inferred to limit the subject matter disclosed herein.

Referring to the figures and in particular to FIGS. 1A and 1B, there is shown an embodiment of a shock absorbing fastener 10 in accordance with the principles of the present invention. The illustrated fastener 10 is a nail and includes a head 12, a shank 14 and a penetrating tip 16. The nail 10 includes one or more deformable features 18 on the nail head 12. In the illustrated embodiment, a series of deformable features 18a-c is shown as rings of uniform height $h_{18}$ that are formed on the upper surface 20 of the nail head 12. In the illustrated embodiment, the rings 18a-c are concentric relative to an axis $A_{10}$ of the nail 10.

Referring briefly to FIGS. 2A and 2B, an alternate embodiment of the nail 110 is shown with the features 118a-c having differing heights $h_{118a}$-$h_{118c}$, that is the ring 118a that is first contacted by the driver blade being outermost and rings 118b-c of lesser heights being formed inwardly of the outer ring 118a.

It will be appreciated that the features can also be, for example, as shown in FIGS. 4A and 4B, raised projections 218 formed as a series of dots or pimples, or other shaped features. The features can have varied heights or uniform heights as desired. It will be also be appreciated that the features or structures can be formed as a single feature or structure, for example, an elongate, single feature or structure (e.g., a single winding raised projection), or the like.

It will be understood from the drawings that the features serve to increase the deceleration time of the blade relative to the head 12 after the fastener 10 head has been fully seated on the substrate. That is, the features are sufficiently stiff and strong to not collapse as the driver blade contacts the head 12 and drives the fastener 10 into the substrate. However, when the head 12 fully seats on the substrate, the blade, which continues to move into the head 12, deforms or collapses the features 18. The energy expended by the blade in deforming the features 18 would then reduce the energy that is seen by the blade contacting the now-seated nail head 12. This reduces the force that the blade would otherwise be subjected to if the blade did not deform the feature(s).

To this end, the deformable feature(s) 318 can be located on the lower surface 322 or underside of the head 312, such as that shown in FIGS. 3A and 3B, in which case the blade and head would exhibit an increase in the deceleration time relative to the substrate.

Sill another embodiment of the shock absorbing fastener 410 is illustrated in FIGS. 5A and 5B. In this embodiment, the deformable features 418, which are shown as elevated ridges running along the upper surface 420 of the head 412, alternate with recesses or valleys 424. The recesses or valleys 424 are formed to provide regions in which the material from the deformable features (ridges) 418 can spread as they are deformed. It will be understood that the recesses or valleys 424 can be formed in any of the previously shown and described embodiments of the fastener 10, 110, 210, 310.

Figure 6A:
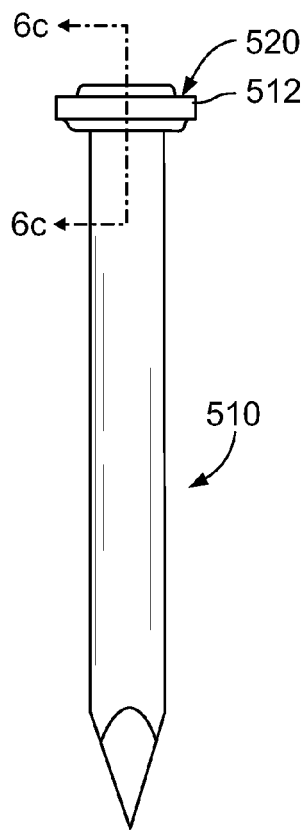
Figure 7A:
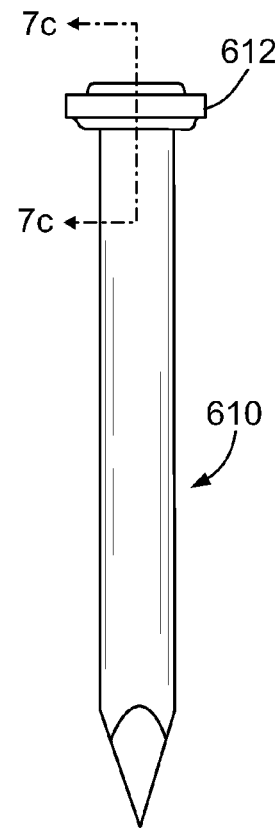
FIGS. 7A-7C illustrate yet another embodiment of the shock absorbing fastener.
Figure 6B:
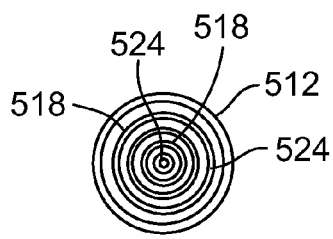
Figure 7B:
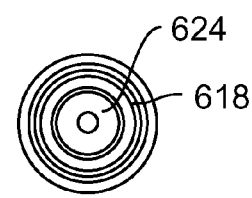
Figure 6C:
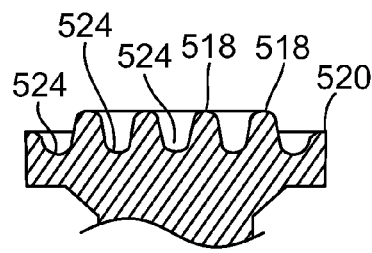
Figure 7C:
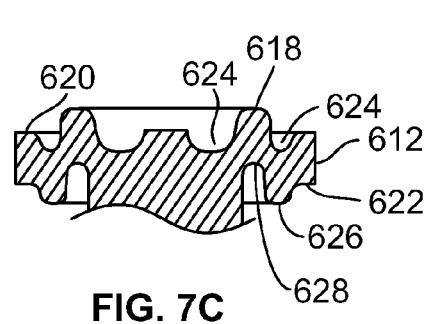

For example, the embodiment of the fastener 510 illustrated in FIGS. 6A-6C include a head 512 with concentric upwardly extending deformable features 518 (rings) and valleys 524 into which material can move when the features 518 are deformed. Likewise, the fastener 610 in FIGS. 7A-7C has concentric upwardly extending deformable features 618 and valleys 624 in conjunction with downwardly extending deformable features 626 (from the lower surface 622 of the head 612) and adjacent valleys 628.

There are numerous ways in which the deformable features 18, 626 can be formed. For example, the fastener shank 14 (nail shank) can be heat treated to prevent the nail 10 from bending when it is driven, while the head 12 and deformable features 18, 626 are not heat treated, which will result in the deformable features being less hard than the shank 14. The deformable features 18, 626 can be formed form a different, softer material than the fastener 10, which features 18, 626 are then subsequently applied to the fastener 10. Forming the deformable features 18, 626 as smaller width $w_{18}$, greater height $h_{18}$ elements (thin, tall profile) can also serve to promote and enhance the deformable function of the feature(s) 18, 626.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A fastener for driving into a substrate, comprising:
a head having an upper surface and a lower surface;
a penetrating tip;
a shank extending from the lower surface of the head to the penetrating tip; and
at least one deformable feature formed integral with and on the head, the deformable feature configured to absorb energy and to deform,
wherein the shank is heat treated and the deformable feature is not heat treated,
wherein when a driving element is driven into the head to drive the fastener into the substrate, the deformable feature absorbs energy and is deformed as the head contacts the substrate, and
wherein the deformable feature has material characteristics different from material characteristics of the shank, such that the deformable feature is softer than the shank.

2. The fastener in accordance with claim 1 wherein the deformable feature is formed on the upper surface of the fastener head.

3. The fastener in accordance with claim 2 wherein the deformable feature is formed as an upwardly projecting winding projection.

4. The fastener in accordance with claim 1 wherein the deformable feature is formed on the lower surface of the fastener head.

5. The fastener in accordance with claim 4 wherein the deformable feature is formed as a downwardly projecting winding projection.

6. The fastener in accordance with claim 1 wherein the deformable feature is formed as a series of features.

7. The fastener in accordance with claim 6 wherein the features of the series of features have differing heights as measured from the surface from which the features extend.

8. The fastener in accordance with claim 6 wherein the features in the series of features have a uniform height as measured from the surface from which the features extend.

9. The fastener in accordance with claim 6 wherein the series of features is a series of rings formed extending from one of the upper and lower surfaces of the head.

10. The fastener in accordance with claim 6 wherein the series of features is a series of pimples formed extending from one of the upper and lower surfaces of the head.

11. The fastener in accordance with claim 10 wherein the series of pimples extends from the upper surface of the head.

12. The fastener in accordance with claim 1 including at least one recess formed in the head, adjacent to the at least one deformable feature.

13. The fastener in accordance with claim 1 wherein deformable features are formed on the upper surface and the lower surface of the fastener head.

14. The fastener in accordance with claim 13 including a plurality of deformable features and a plurality of recesses wherein the recesses are formed adjacent the deformable features, the deformable features being formed on both the upper surface and the lower surface of the head.

15. A fastener for driving into a substrate, comprising:
a head having an upper surface and a lower surface;
a penetrating tip;
a shank extending from the lower surface of the head to the penetrating tip; and
a plurality of deformable features and a plurality of recesses formed on the head, wherein the recesses are formed adjacent the deformable features, the deformable features configured to absorb energy and to deform,
wherein when a driving element is driven into the head to drive the fastener into the substrate, the deformable features absorb energy and are deformed as the head contacts the substrate, and
wherein the deformable features have material characteristics different from material characteristics of the shank, such that the deformable features are softer than the shank.

* * * * *